(12) United States Patent
Lei

(10) Patent No.: US 10,833,813 B2
(45) Date of Patent: Nov. 10, 2020

(54) RETRANSMISSION INDICATION

(71) Applicant: Lenovo Innovations Limited (Hong Kong), Hong Kong (CN)

(72) Inventor: Haipeng Lei, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 0 days.

(21) Appl. No.: 16/338,327

(22) PCT Filed: Sep. 30, 2016

(86) PCT No.: PCT/CN2016/101115
§ 371 (c)(1),
(2) Date: Mar. 29, 2019

(87) PCT Pub. No.: WO2018/058543
PCT Pub. Date: Apr. 5, 2018

(65) Prior Publication Data
US 2020/0028628 A1 Jan. 23, 2020

(51) Int. Cl.
*H04L 1/18* (2006.01)
*H04L 5/00* (2006.01)
*H04W 72/04* (2009.01)

(52) U.S. Cl.
CPC .......... *H04L 1/1819* (2013.01); *H04L 5/0021* (2013.01); *H04L 5/0055* (2013.01); *H04W 72/042* (2013.01); *H04W 72/0446* (2013.01)

(58) Field of Classification Search
None
See application file for complete search history.

(56) References Cited

U.S. PATENT DOCUMENTS

| 2012/0051305 | A1 | 3/2012 | Wang et al. | |
| 2015/0271840 | A1* | 9/2015 | Tavildar | H04L 1/08 370/329 |
| 2015/0326356 | A1* | 11/2015 | Guan | H04W 52/50 370/330 |
| 2016/0050658 | A1* | 2/2016 | Tabet | H04L 1/1812 370/329 |

FOREIGN PATENT DOCUMENTS

| CN | 102340386 A | 2/2012 |
| CN | 102546134 A | 7/2012 |
| CN | 103873215 A | 6/2014 |
| WO | 2012090028 A1 | 7/2012 |

OTHER PUBLICATIONS

PCT/CN2016/101115, "International Search Report", dated Jun. 30, 2017, pp. 1-3.
PCT/CN2016/101115, Written Opinion of the International Searching Authority, dated Jun. 30, 2017, pp. 1-4.

* cited by examiner

*Primary Examiner* — Christine T Duong
(74) *Attorney, Agent, or Firm* — Kunzler Bean & Adamson

(57) ABSTRACT

Apparatuses, methods, and systems are disclosed for retransmission indication. One apparatus includes a receiver that receives a first reference signal transmitted on a first set of resource elements from a device. The first reference signal is associated with a first data. The apparatus also includes the receiver receiving a second reference signal transmitted on a second set of resource elements from the device. The second reference signal is associated with a second data, and the first data and the second data may be different redundant versions of data.

25 Claims, 9 Drawing Sheets

RETRANSMISSION INDICATION

FIELD

The subject matter disclosed herein relates generally to wireless communications and more particularly relates to retransmission indication.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Downlink Control Information ("DCI"), Downlink ("DL"), Downlink Pilot Time Slot ("DwPTS"), Enhanced Clear Channel Assessment ("eCCA"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Licensed Assisted Access ("LAA"), Load Based Equipment ("LBE"), Listen-Before-Talk ("LBT"), Long Term Evolution ("LTE"), Multiple Access ("MA"), Machine Type Communication ("MTC"), Multiple Input Multiple Output ("MIMO"), Multi User Shared Access ("MUSA"), Negative-Acknowledgment ("NACK") or ("NAK"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliable and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, to avoid resource collision in uplink communication, the networks adopt orthogonal multiple access ("OMA"). The networks may also use scheduling-based uplink transmission so that the orthogonal resources are assigned for different UEs. Moreover, any uplink communication (e.g., except PRACH) may be scheduled and/or controlled by an eNB. As compared to OMA, non-orthogonal multiple access ("NOMA") may support signal superposition in an orthogonal resource. Accordingly, NOMA may enhance spectrum utilization efficiency, such as in cases of overloaded transmission. Moreover, since NOMA may separate superposed signals at the receiver by using more advanced algorithms, NOMA may support reliable and low latency grant-free transmission. Such transmission may be used for massive MTC and/or URLLC.

In configurations that use NOMA, (e.g., SCMA, MUSA/RSMA, PDMA) an MA resource may include a physical resource and a signature. Moreover, the physical resource may include a resource block in a time-frequency domain, and the signature may be directly related to a NOMA scheme. The signature may be a codebook, a codeword, a sequence, an interleaver, a mapping pattern, a demodulation reference signal, a preamble, and/or a resource in a spatial or power dimension. Different UEs using a same physical time-frequency resource may be differentiated by different signatures transmitted by UEs and then combined through a channel, so that a receiver may separate the superposed signals by using advanced multi-user detection ("MUD") algorithms (e.g., message passing algorithm ("MPA") for SCMA and PDMA, successive interference cancellation ("SIC") for MUSA and PDMA, parallel interference cancellation ("PIC"), and matching filter ("MF") for RSMA). Certain receiver algorithms may have better performance at the cost of more complexity. Considering that an eNB may be able to handle higher complexity than a UE, NOMA may be better for uplink transmission than downlink transmission. When NOMA is combined with UL grant-free transmission, it may support reliable and low latency UL transmission, which may be used for massive MTC and URLLC.

Nevertheless, if the grant-free UL transmission is directly introduced, it may result in problems with eNB reception due to the eNB not being aware of time-frequency resources, a modulation and coding scheme ("MCS"), HARQ process identification ("ID"), redundancy version ("RV"), and/or new data indicator ("NDI"), and so forth for a transmitting UE. Without the information of time-frequency resources, the eNB may blindly detect each possibility of resource usage. Such blind detection may result in excessive complexity and may use too much processing time.

For grant-free transmission in uplink, some information may be predefined to reduce the blind detection effort (e.g., partition the physical time-frequency resource into several non-overlapped subchannels and each uplink transmission may occupy one subchannel, reduce the scope of candidate MCS or preconfigure a MCS for a UE via RRC signaling, limit the number of HARQ process to 1 to one UE, and limit the number of transmission of one TB to 1). In that sense, the blind detection in eNB implementation may be greatly simplified. However, this simplified eNB implementation sacrifices the potential performance gain due to link adaptation and flexibility. In some configurations of NOMA, without retransmission and combination one-shot transmission may not ensure performance.

BRIEF SUMMARY

Apparatuses for retransmission indication are disclosed. Methods and systems also perform the functions of the apparatus. In one embodiment, the apparatus includes a receiver that receives a first reference signal transmitted on a first set of resource elements from a device. In such an embodiment, the first reference signal may be associated with a first data. The apparatus also includes the receiver receiving a second reference signal transmitted on a second set of resource elements from the device. The second reference signal may be associated with a second data, and the first data and the second data may be different redundant versions of data.

In one embodiment, the apparatus includes a transmitter that transmits a signal to the device for indicating the first reference signal and the second reference signal. In a further embodiment, the first reference signal and the second reference signal are different and the first set of resource elements and the second set of resource elements are the same. In certain embodiments, the first reference signal and the second reference signal are the same and the first set of resource elements and the second set of resource elements are different.

In some embodiments, the first set of resource elements includes each resource element in a frequency domain and the second set of resource elements includes even numbered resource elements in the frequency domain. In various embodiments, the first set of resource elements includes each resource element in a frequency domain and the second set of resource elements includes odd numbered resource elements in the frequency domain. In certain embodiments, the first set of resource elements includes even numbered resource elements in a frequency domain and the second set of resource elements includes odd numbered resource elements in the frequency domain. In one embodiment, the first set of resource elements includes the same resource elements in a first slot and a second slot of one subframe, and the second set of resource elements includes different resource elements in the first slot and the second slot of one subframe. In some embodiments, the apparatus includes a processor that selects the first reference signal and second reference signal for the device. In various embodiments, the first reference signal indicates the first data is a first transmission of data and the second reference signal indicates the second data is a retransmission of the data.

In certain embodiments, the first reference signal indicates the first data is redundancy version 0 of data and the second reference signal indicates the second data is redundancy version 2 of the data. In some embodiments, the apparatus includes a processor that combines the second data with the first data.

A method for retransmission indication, in one embodiment, includes receiving a first reference signal transmitted on a first set of resource elements from a device. In some embodiments, the first reference signal is associated with a first data. The method also includes receiving a second reference signal transmitted on a second set of resource elements from the device. In various embodiments, the second reference signal is associated with a second data, and the first data and the second data are different redundant versions of data.

In one embodiment, an apparatus includes a transmitter that transmits a first reference signal on a first set of resource elements. In such an embodiment, the first reference signal may be associated with a first data. The apparatus also includes the transmitter transmitting a second reference signal on a second set of resource elements. The second reference signal may be associated with a second data, and the first data and the second data may be different redundant versions of data.

In one embodiment, the apparatus includes a receiver that receives a signal for indicating the first reference signal and the second reference signal. In a further embodiment, the first reference signal and the second reference signal are different and the first set of resource elements and the second set of resource elements are the same. In certain embodiments, the first reference signal and the second reference signal are the same and the first set of resource elements and the second set of resource elements are different.

In some embodiments, the first set of resource elements includes each resource element in a frequency domain and the second set of resource elements includes even numbered resource elements in the frequency domain. In various embodiments, the first set of resource elements includes each resource element in a frequency domain and the second set of resource elements includes odd numbered resource elements in the frequency domain. In certain embodiments, the first set of resource elements includes even numbered resource elements in a frequency domain and the second set of resource elements includes odd numbered resource elements in the frequency domain. In one embodiment, the first set of resource elements includes the same resource elements in a first slot and a second slot of one subframe, and the second set of resource elements includes different resource elements in the first slot and the second slot of one subframe. In some embodiments, the apparatus includes a processor that generates the second data if the acknowledgement to the first data is non-acknowledgment, discontinuous transmission, or not received. In various embodiments, the first reference signal indicates the first data is a first transmission of data and the second reference signal indicates the second data is a retransmission of the data.

In certain embodiments, the first reference signal indicates the first data is redundancy version 0 of data and the second reference signal indicates the second data is redundancy version 2 of the data.

A method for retransmission indication, in one embodiment, includes transmitting a first reference signal on a first set of resource elements. In some embodiments, the first reference signal is associated with a first data. The method also includes transmitting a second reference signal on a second set of resource elements. In various embodiments, the second reference signal is associated with a second data, and the first data and the second data are different redundant versions of data.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
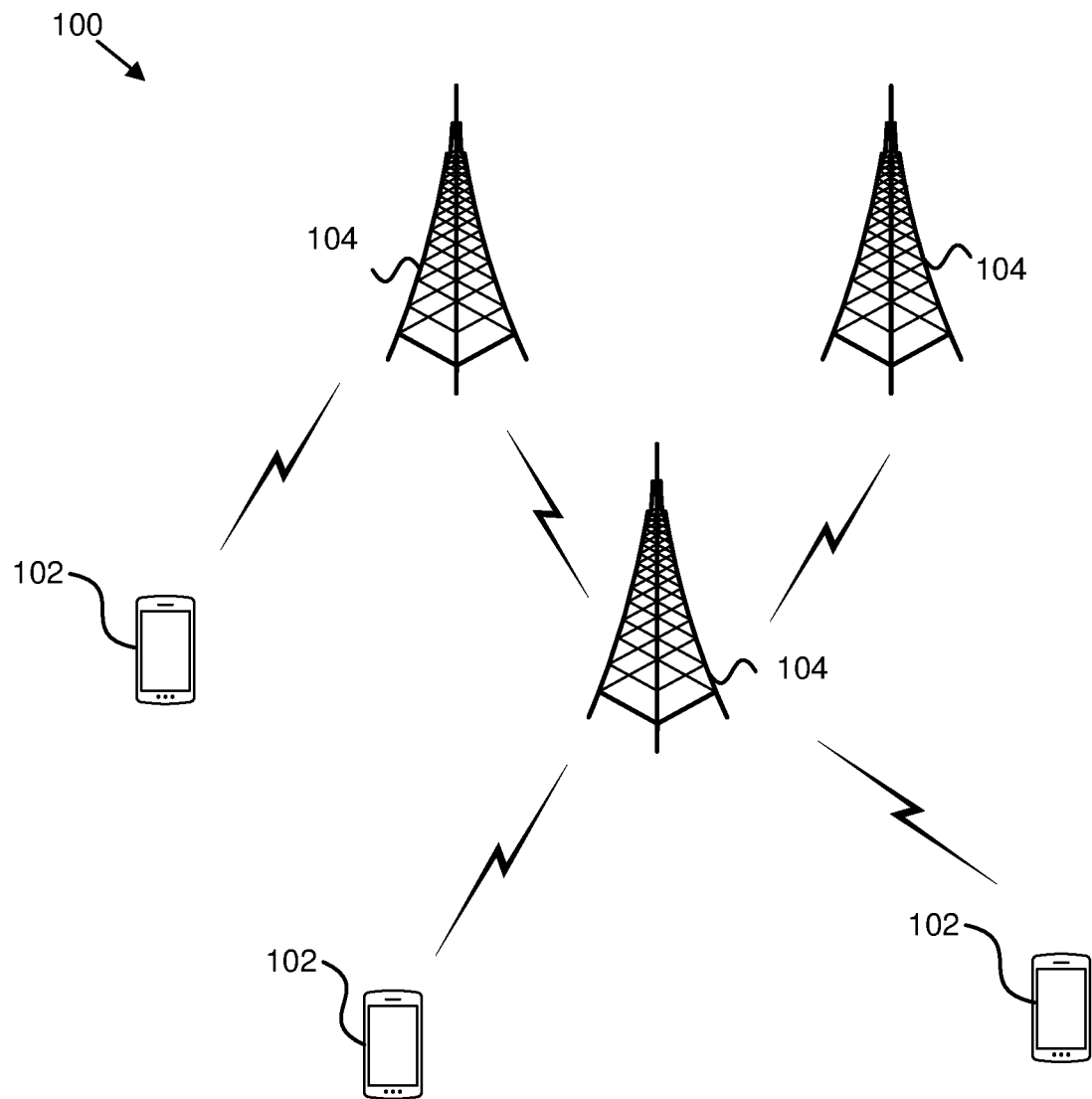
FIG. 1 is a schematic block diagram illustrating one embodiment of a wireless communication system for retransmission indication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for retransmission indication. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may receive a first reference signal transmitted on a first set of resource elements from a device. In some embodiments, the first reference signal is associated with a first data. The base unit 104 may also receive a second reference signal transmitted on a second set of resource elements from the device. In various embodiments, the second reference signal is associated with a second data, and the first data and the second data are different redundant versions of data. Accordingly, a base unit 104 may receive a retransmission indication.

In another embodiment, a remote unit 102 may transmit a first reference signal on a first set of resource elements. In some embodiments, the first reference signal is associated with a first data. The remote unit 102 may transmit a second reference signal on a second set of resource elements. In various embodiments, the second reference signal is associated with a second data, and the first data and the second data are different redundant versions of data. Accordingly, a remote unit 102 may transmit a retransmission indication.

Figure 2:
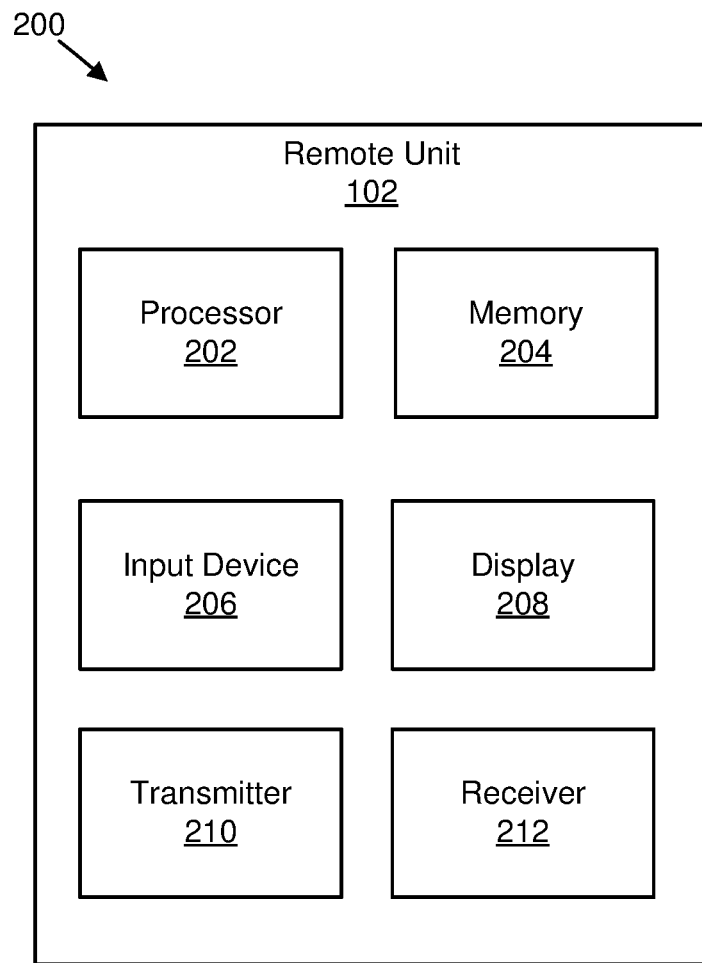
FIG. 2 is a schematic block diagram illustrating one embodiment of an apparatus that may be used for retransmission indication.

FIG. 2 depicts one embodiment of an apparatus 200 that may be used for retransmission indication. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit a first reference signal on a first set of resource elements. The first resource signal may be associated with a first data. In certain embodiments, the transmitter 210 may be used to transmit a second reference signal on a second set of resource elements. The second resource signal may be associated with a second data, and the first data and the second data may be different redundant versions of data. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
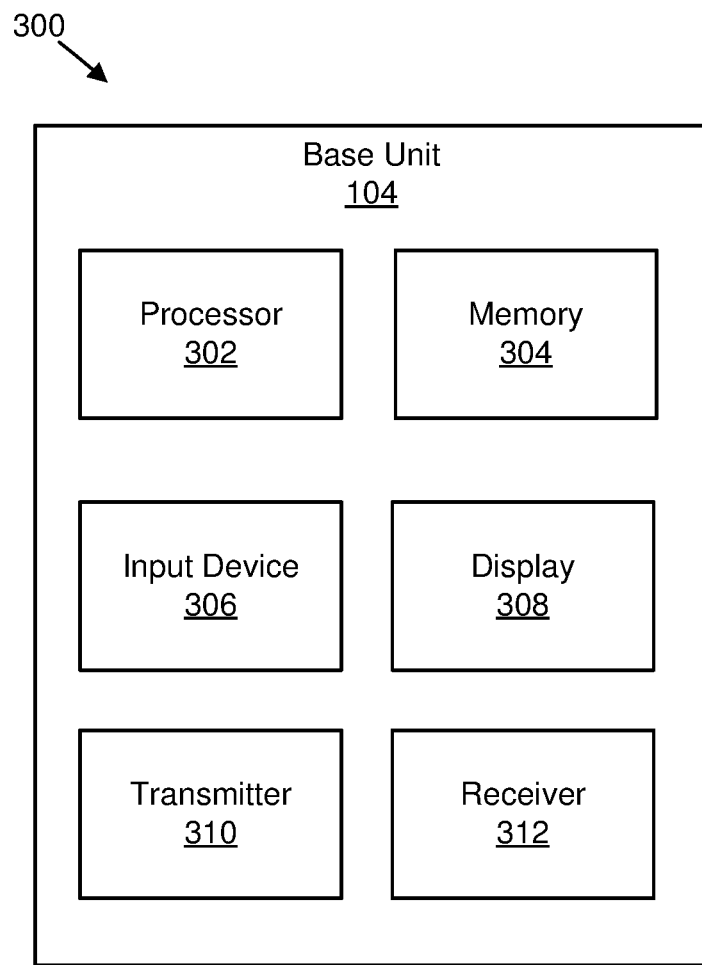
FIG. 3 is a schematic block diagram illustrating one embodiment of an apparatus that may be used for retransmission indication.

FIG. 3 depicts one embodiment of an apparatus 300 that may be used for retransmission indication. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively.

The receiver 312 may be used to receive a first reference signal transmitted on a first set of resource elements from a device. The first reference signal may be associated with a first data. The receiver 312 may also be used to receive a second reference signal transmitted on a second set of resource elements from the device. The second reference signal may be associated with a second data, and the first data and the second data may be different redundant versions of data. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
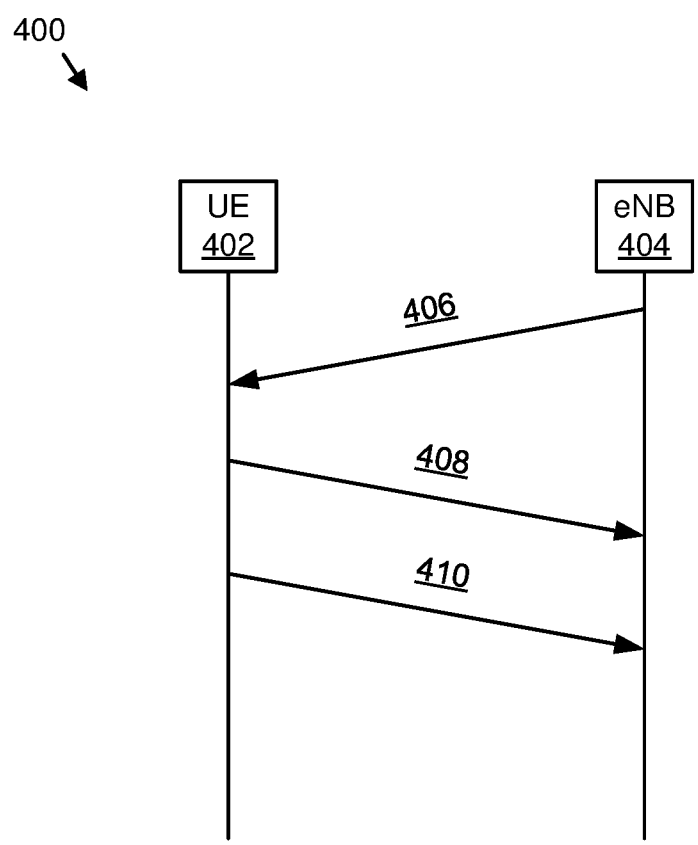
FIG. 4 illustrates one embodiment of communications for retransmission indication.

FIG. 4 illustrates one embodiment of communications 400 for retransmission indication. Specifically, communications 400 between a UE 402 and an eNB 404 are illustrated. A first communication 406 may include configuration information transmitted from the eNB 404 and received by the UE 402. In some embodiments, the configuration information is indicated by RRC signaling. The configuration information may include an indication of a resource to be used for transmissions, and/or one or more reference signals to be used, among other things.

A second communication 408 includes a transmission of data from the UE 402 to the eNB 404. The transmission of data may be associated with a first reference signal transmitted on a first set of resource elements. A third communication 410 includes a retransmission of data from the UE 402 to the eNB 404. The retransmission of data may be associated with a second reference signal transmitted on a second set of resource elements. In some embodiments, the first and second reference signals are the same; while in other embodiments, the first and second reference signals are different. In various embodiments, the first set of resource elements includes a first pattern of resource elements and the second set of resource elements includes a second pattern of resource elements. In some embodiments, the first pattern of resource elements may be the same as the second pattern of resource elements; while in other embodiments, the first pattern of resource elements may be different from the second pattern of resource elements. FIGS. 5A through 7B illustrate various embodiments of patterns for transmission of data and retransmission of the data.

Figure 5A:
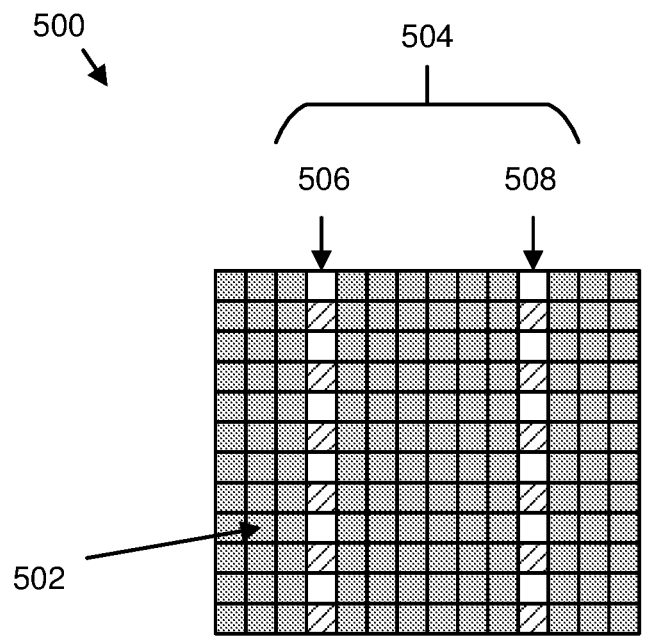
FIGS. 5A and 5B illustrate one embodiment of a retransmission indication.
Figure 5B:
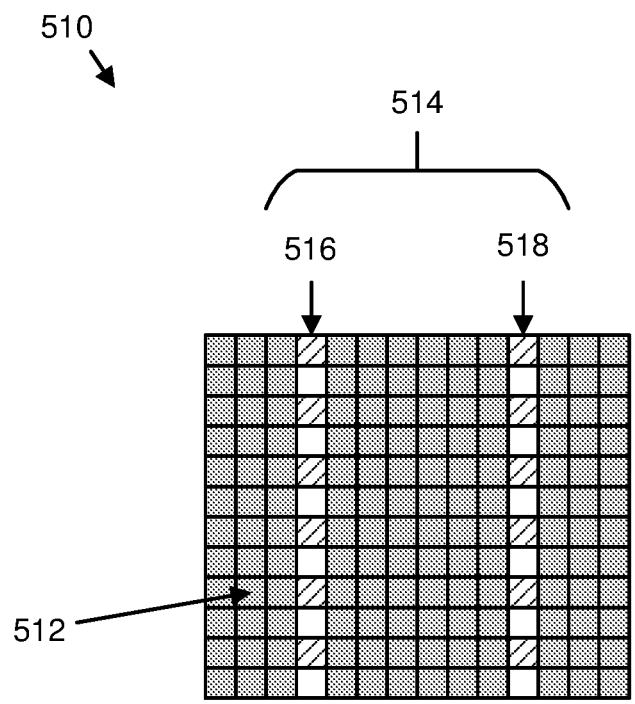

FIGS. 5A and 5B illustrate one embodiment of a retransmission indication. Specifically, as illustrated in FIG. 5A, a first subframe 500 (one PRB of one subframe) includes a first resource element 502 used for transmission of data and a first set of resource elements 504 used to transmit a first reference signal. The first set of resource elements 504 includes first slot resource elements 506 and second slot resource elements 508. Each of the first and second slot resource elements 506 and 508 includes only even numbered resource elements. As may be appreciated, the first resource element 502 may be any suitable resource element in the first subframe 500.

In FIG. 5B, a second subframe 510 (one PRB of one subframe) includes a second resource element 512 used for retransmission of data and a second set of resource elements 514 used to transmit a second reference signal. The second set of resource elements 514 includes first slot resource elements 516 and second slot resource elements 518. Each of the first and second slot resource elements 516 and 518 includes only odd numbered resource elements. As may be appreciated, the second resource element 512 may be any suitable resource element in the second subframe 510. As illustrated, the pattern of the second set of resources elements 514 is different from the pattern of the first set of resource elements 504 to facilitate a base station 104 determining whether received data is a transmission or a retransmission. Although the first subframe 500 is used for transmission of data and the second subframe 510 is used for retransmission of data, in other embodiments, the second subframe 510 may be used for transmission of data and the first subframe 500 may be used for retransmission of data. In the illustrated embodiments of FIGS. 5A and 5B, the first and second reference signals are the same; while in other embodiments, the first and second reference signals may be different, and the pattern of the first set of resource elements 504 may be the same as the pattern of the second set of resource elements 514.

Figure 6A:
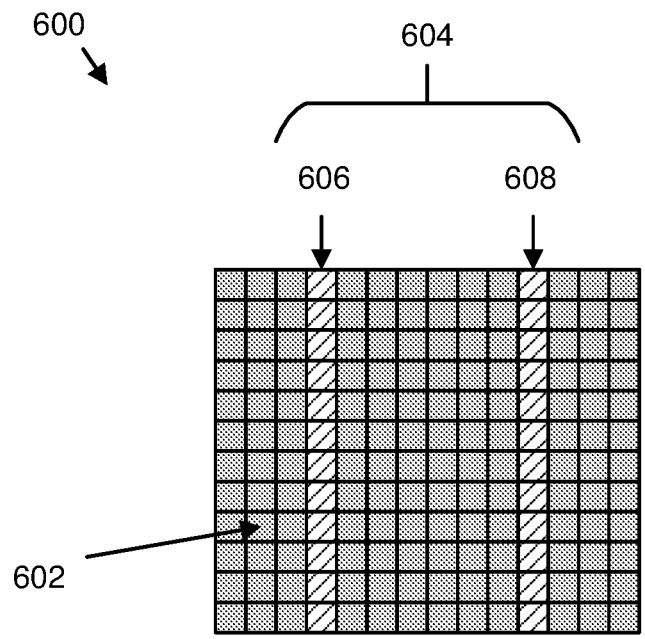
FIGS. 6A and 6B illustrate another embodiment of a retransmission indication.
Figure 6B:
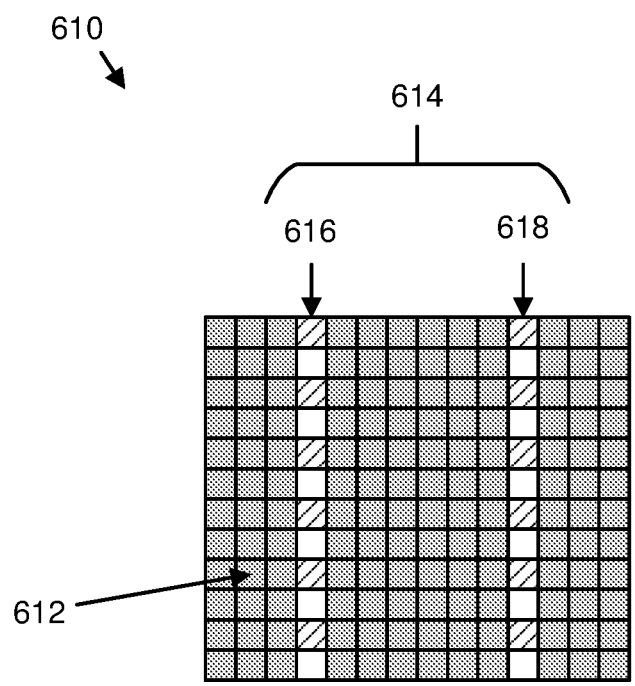

FIGS. 6A and 6B illustrate another embodiment of a retransmission indication. Specifically, as illustrated in FIG. 6A, a first subframe 600 (one PRB of one subframe) includes a first resource element 602 used for transmission of data and a first set of resource elements 604 used to transmit a first reference signal. The first set of resource elements 604 includes first slot resource elements 606 and second slot resource elements 608. Each of the first and second slot resource elements 606 and 608 includes odd and even numbered resource elements. As may be appreciated, the first resource element 602 may be any suitable resource element in the first subframe 600.

In FIG. 6B, a second subframe 610 (one PRB of one subframe) includes a second resource element 612 used for retransmission of data and a second set of resource elements 614 used to transmit a second reference signal. The second set of resource elements 614 includes first slot resource elements 616 and second slot resource elements 618. Each of the first and second slot resource elements 616 and 618 includes only odd numbered resource elements (other embodiments may include only even numbered resource elements). As may be appreciated, the second resource element 612 may be any suitable resource element in the second subframe 610. As illustrated, the pattern of the second set of resources elements 614 is different from the pattern of the first set of resource elements 604 to facilitate a base station 104 determining whether received data is a transmission or a retransmission. Although the first subframe 600 is used for transmission of data and the second subframe 610 is used for retransmission of data, in other embodiments, the second subframe 610 may be used for transmission of data and the first subframe 600 may be used for retransmission of data. In the illustrated embodiments of FIGS. 6A and 6B, the first and second reference signals are the same; while in other embodiments, the first and second reference signals may be different, and the pattern of the first set of resource elements 604 may be the same as the pattern of the second set of resource elements 614.

Figure 7A:
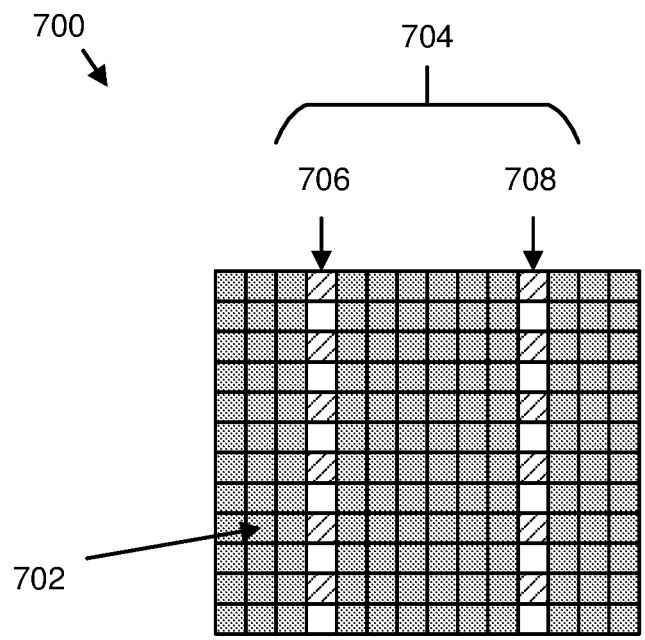
FIGS. 7A and 7B illustrate a further embodiment of a retransmission indication.
Figure 7B:
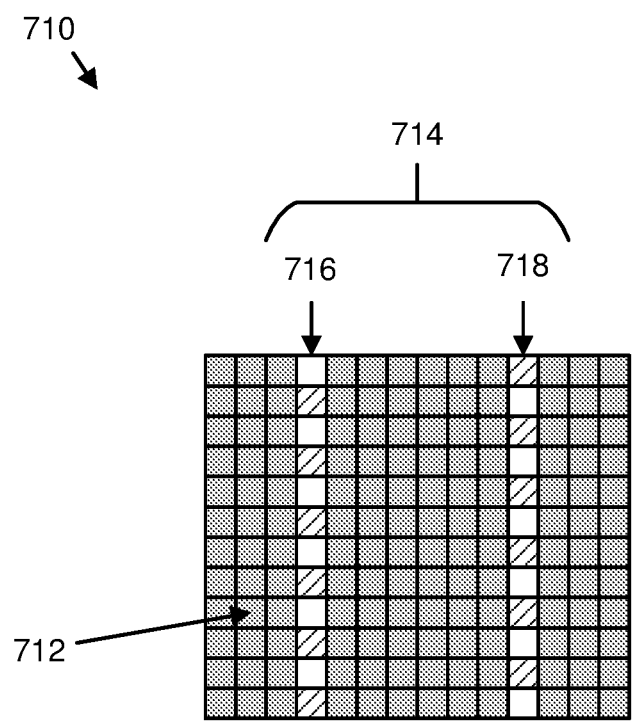

FIGS. 7A and 7B illustrate a further embodiment of a retransmission indication. Specifically, as illustrated in FIG. 7A, a first subframe 700 (one PRB of one subframe) includes a first resource element 702 used for transmission of data and a first set of resource elements 704 used to transmit a first reference signal. The first set of resource elements 704 includes first slot resource elements 706 and second slot resource elements 708. Each of the first and second slot resource elements 706 and 708 includes only odd numbered resource elements (other embodiments may include only even numbered resource elements). As may be appreciated, the first resource element 702 may be any suitable resource element in the first subframe 700.

In FIG. 7B, a second subframe 710 (one PRB of one subframe) includes a second resource element 712 used for retransmission of data and a second set of resource elements 714 used to transmit a second reference signal. The second set of resource elements 714 includes first slot resource elements 716 and second slot resource elements 718. The first slot resource elements 716 include only even numbered resource elements (other embodiments may include only odd numbered resource elements) and the second slot resource elements 718 include only odd numbered resource elements (other embodiments may include only even numbered resource elements). As may be appreciated, the second resource element 712 may be any suitable resource element in the second subframe 710. As illustrated, the pattern of the second set of resources elements 714 is different from the pattern of the first set of resource elements 704 to facilitate a base station 104 determining whether received data is a transmission or a retransmission. Although the first subframe 700 is used for transmission of data and the second subframe 710 is used for retransmission of data, in other embodiments, the second subframe 710 may be used for transmission of data and the first subframe 700 may be used for retransmission of data. In the illustrated embodiments of FIGS. 7A and 7B, the first and second reference signals are the same; while in other embodiments, the first and second reference signals may be different, and the pattern of the first set of resource elements 704 may be the same as the pattern of the second set of resource elements 714.

Figure 8:
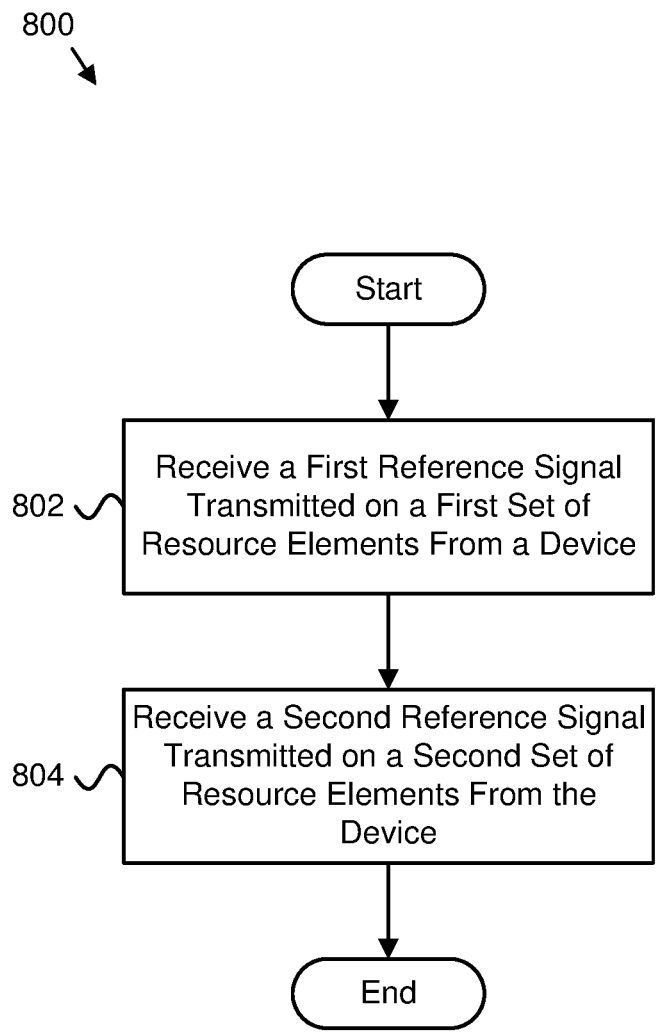
FIG. 8 is a schematic flow chart diagram illustrating one embodiment of a method for retransmission indication.

FIG. 8 is a schematic flow chart diagram illustrating one embodiment of a method 800 for retransmission indication. In some embodiments, the method 800 is performed by an apparatus, such as the base unit 104. In certain embodiments, the method 800 may be performed by a processor executing program code, for example, a microcontroller, a microprocessor, a CPU, a GPU, an auxiliary processing unit, a FPGA, or the like.

The method 800 may include receiving 802 a first reference signal transmitted on a first set of resource elements from a device. In such an embodiment, the first reference signal is associated with a first data. The method 800 also includes receiving 804 a second reference signal transmitted on a second set of resource elements from the device. In such an embodiment, the second reference signal is associated with a second data, and the first data and the second data are different redundant versions of data.

In one embodiment, the method 800 includes transmitting a signal to the device for indicating the first reference signal and the second reference signal. In a further embodiment, the first reference signal and the second reference signal are different and the first set of resource elements and the second set of resource elements are the same. In certain embodiments, the first reference signal and the second reference signal are the same and the first set of resource elements and the second set of resource elements are different.

In some embodiments, the first set of resource elements includes each resource element in a frequency domain and the second set of resource elements includes even numbered resource elements in the frequency domain. In various embodiments, the first set of resource elements includes each resource element in a frequency domain and the second set of resource elements includes odd numbered resource elements in the frequency domain. In certain embodiments, the first set of resource elements includes even numbered resource elements in a frequency domain and the second set of resource elements includes odd numbered resource elements in the frequency domain. In one embodiment, the first set of resource elements includes the same resource elements in a first slot and a second slot of one subframe, and the second set of resource elements includes different resource elements in the first slot and the second slot of one subframe. In some embodiments, the method 800 includes selecting the first reference signal and second reference signal for the device. In various embodiments, the first reference signal indicates the first data is a first transmission of data and the second reference signal indicates the second data is a retransmission of the data.

In certain embodiments, the first reference signal indicates the first data is redundancy version 0 of data and the second reference signal indicates the second data is redundancy version 2 of the data. In some embodiments, the method 800 includes combining the second data with the first data.

Figure 9:
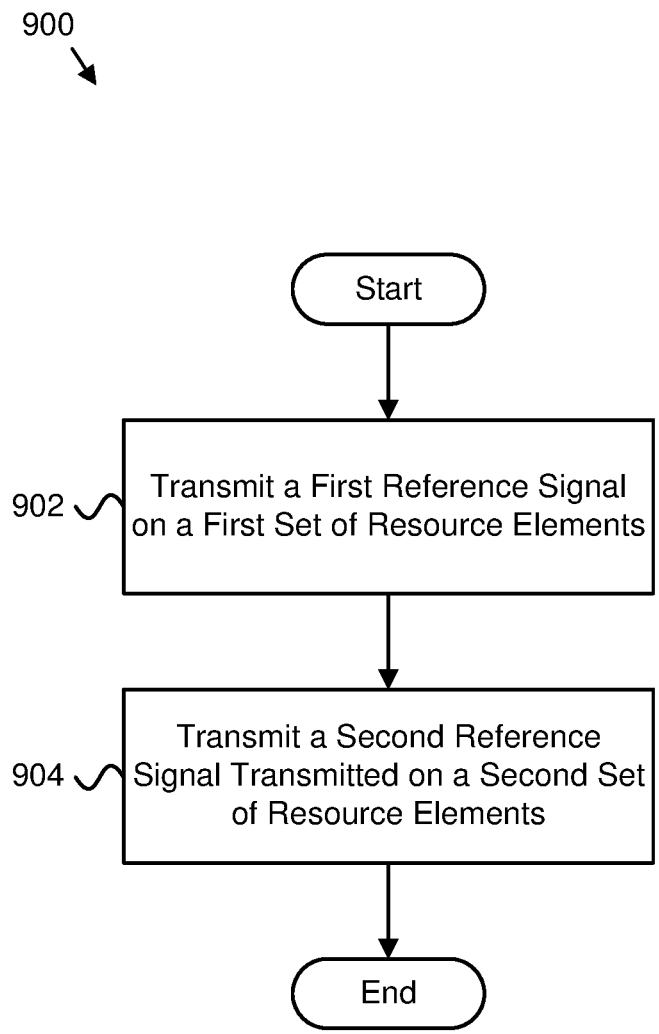
FIG. 9 is a schematic flow chart diagram illustrating another embodiment of a method for retransmission indication.

FIG. 9 is a schematic flow chart diagram illustrating one embodiment of a method 900 for retransmission indication. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include transmitting 902 a first reference signal on a first set of resource elements. In such an embodiment, the first resource signal is associated with a first data. The method 900 also includes transmitting 904 a second reference signal on a second set of resource elements. In such embodiments, the first data and the second data are different redundant versions of data.

In one embodiment, the method 900 includes receiving a signal for indicating the first reference signal and the second reference signal. In a further embodiment, the first reference signal and the second reference signal are different and the first set of resource elements and the second set of resource elements are the same. In certain embodiments, the first reference signal and the second reference signal are the same and the first set of resource elements and the second set of resource elements are different.

In some embodiments, the first set of resource elements includes each resource element in a frequency domain and the second set of resource elements includes even numbered resource elements in the frequency domain. In various embodiments, the first set of resource elements includes each resource element in a frequency domain and the second set of resource elements includes odd numbered resource elements in the frequency domain. In certain embodiments, the first set of resource elements includes even numbered resource elements in a frequency domain and the second pattern includes odd numbered resource elements in the frequency domain. In one embodiment, the first set of resource elements includes the same resource elements in a first slot and a second slot of one subframe, and the second set of resource elements includes different resource elements in the first slot and the second slot of one subframe.

In some embodiments, the method 900 includes generating the second data if the acknowledgement to the first data is non-acknowledgment or discontinuous transmission. In various embodiments, the first reference signal indicates the first data is a first transmission of data and the second reference signal indicates the second data is a retransmission of the data.

In certain embodiments, the first reference signal indicates the first data is redundancy version 0 of data and the second reference signal indicates the second data is redundancy version 2 of the data.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
 a processor; and
 a receiver that:
  receives a first reference signal transmitted on a first set of resource elements from a device, wherein the first reference signal is used by the processor to demodulate a first data associated with the first reference signal; and
  receives a second reference signal transmitted on a second set of resource elements from the device, wherein the second reference signal is used by the processor to demodulate a second data associated with the second reference signal, and the first data and the second data are different redundant versions of data.

2. The apparatus of claim 1, further comprising a transmitter that transmits a signal to the device for indicating the first reference signal and the second reference signal.

3. The apparatus of claim 1, wherein the processor selects the first reference signal and second reference signal for the device.

4. The apparatus of claim 1, wherein the processor combines the second data with the first data.

5. A method comprising:
receiving a first reference signal transmitted on a first set of resource elements from a device, wherein the first reference signal is used for demodulation of a first data associated with the first reference signal; and
receiving a second reference signal transmitted on a second set of resource elements from the device, wherein the second reference signal is used for demodulation of a second data associated with the second reference signal, and the first data and the second data are different redundant versions of data.

6. The method of claim 5, wherein the first reference signal and the second reference signal are different and the first set of resource elements and the second set of resource elements are the same.

7. The method of claim 5, wherein the first reference signal and the second reference signal are the same and the first set of resource elements and the second set of resource elements are different.

8. The method of claim 7, wherein the first set of resource elements comprises each resource element in a frequency domain and the second set of resource elements comprises even numbered resource elements in the frequency domain.

9. The method of claim 7, wherein the first set of resource elements comprises each resource element in a frequency domain and the second set of resource elements comprises odd numbered resource elements in the frequency domain.

10. The method of claim 7, wherein the first set of resource elements comprises even numbered resource elements in a frequency domain and the second set of resource elements comprises odd numbered resource elements in the frequency domain.

11. The method of claim 7, wherein the first set of resource elements comprises the same resource elements in a first slot and a second slot of one subframe, and the second set of resource elements comprises different resource elements in the first slot and the second slot of one subframe.

12. The method of claim 5, wherein the first reference signal indicates the first data is a first transmission of the data and the second reference signal indicates the second data is a retransmission of the data.

13. The method of claim 5, wherein the first reference signal indicates the first data is redundancy version 0 of the data and the second reference signal indicates the second data is redundancy version 2 of the data.

14. An apparatus comprising:
a transmitter that:
transmits, to a base unit, a first reference signal on a first set of resource elements, wherein the first resource signal is used by the base unit to demodulate a first data associated with the first reference signal; and
transmits, to the base unit, a second reference signal on a second set of resource elements, wherein the second resource signal is used by the base unit to demodulate a second data associated with the second reference signal, and the first data and the second data are different redundant versions of data.

15. The apparatus of claim 14, further comprising a receiver that receives a signal for indicating the first reference signal and the second reference signal.

16. The apparatus of claim 14, further comprising a processor that generates the second data if the acknowledgement to the first data is non-acknowledgment, discontinuous transmission, or not received.

17. A method comprising:
transmitting, to a base unit, a first reference signal on a first set of resource elements, wherein the first resource signal is used by the base unit to demodulate a first data associated with the first reference signal; and
transmitting, to the base unit, a second reference signal on a second set of resource elements, wherein the second resource signal is used by the base unit to demodulate a second data associated with the second reference signal, and the first data and the second data are different redundant versions of data.

18. The method of claim 17, wherein the first reference signal and the second reference signal are different and the first set of resource elements and the second set of resource elements are the same.

19. The method of claim 17, wherein the first reference signal and the second reference signal are the same and the first set of resource elements and the second set of resource elements are different.

20. The method of claim 19, wherein the first set of resource elements comprises each resource element in a frequency domain and the second set of resource elements comprises even numbered resource elements in the frequency domain.

21. The method of claim 19, wherein the first set of resource elements comprises each resource element in a frequency domain and the second set of resource elements comprises odd numbered resource elements in the frequency domain.

22. The method of claim 19, wherein the first set of resource elements comprises even numbered resource elements in a frequency domain and the second set of resource elements comprises odd numbered resource elements in the frequency domain.

23. The method of claim 19, wherein the first set of resource elements comprises the same resource elements in a first slot and a second slot of one subframe, and the second set of resource elements comprises different resource elements in the first slot and the second slot of one subframe.

24. The method of claim 17, wherein the first reference signal indicates the first data is a first transmission of the data and the second reference signal indicates the second data is a retransmission of the data.

25. The method of claim 17, wherein the first reference signal indicates the first data is redundancy version 0 of the data and the second reference signal indicates the second data is redundancy version 2 of the data.

* * * * *